Figure 1:
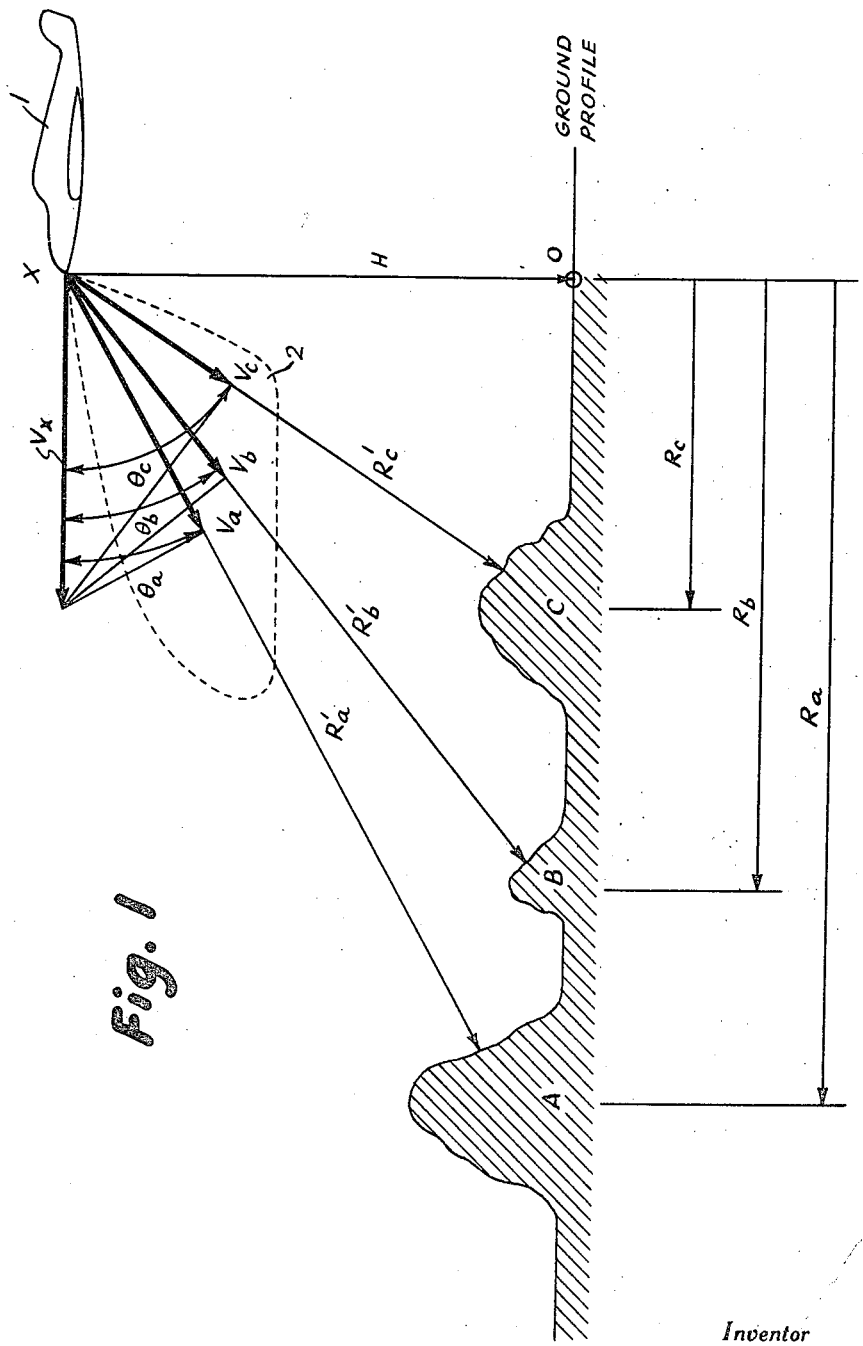

Inventor
RICHARD R. WAER
By Philip M. Bolton
Attorney

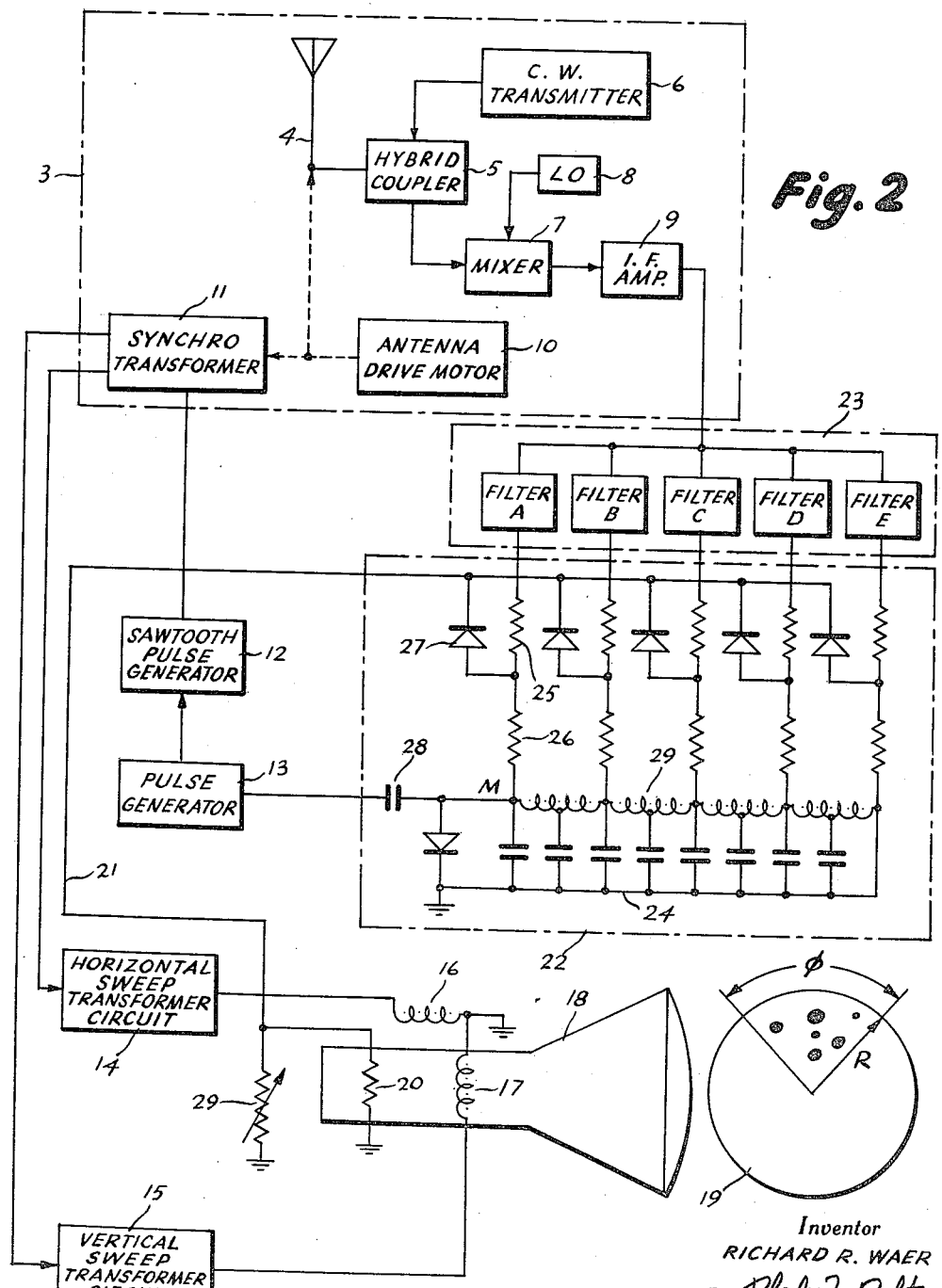

United States Patent Office 3,081,456
Patented Mar. 12, 1963

3,081,456
CONTINUOUS WAVE RADAR WITH PPI
TYPE DISPLAY
Richard R. Waer, Easton, Pa., assignor to International
Telephone and Telegraph Corporation, Nutley, N.J.,
a corporation of Maryland
Filed Dec. 23, 1957, Ser. No. 704,617
3 Claims. (Cl. 343—10)

This invention relates to PPI type displays and in particular to a continuous wave radar system employing Doppler shift of the reflected signal to detect the relative range from a moving aircraft to reflecting bodies on the ground and to indicate this information on a PPI type display.

A large number of aircraft mishaps are attributable to ground hazards invisible to the pilot because of poor visibility or lack of alertness. These ground hazards often exist when flying off course or over unfamiliar terrain. In the past pulse type radar systems have been employed in aircraft to detect ground hazards or ground protuberances in the flight path. In certain of these prior systems search pulses are radiated into a selected region and their echoes detected; the interval between transmission of a search pulse and detection of its echo being a measure of the distance to the reflecting protuberance and serving to warn the pilot of the proximity of the protuberance. In some of these pulse echo radar systems, PPI displays are employed to provide the pilot with a plan picture of the terrain beneath his craft. Other prior systems make use of the Doppler shift of the reflected radar signal to distinguish between protuberances directly along the flight path and those on either side of the flight path.

An object of this invention is to provide a PPI type display of protuberances beneath a moving craft whereby the operator of the craft by inspecting the display may be informed of the relative position and size of said protuberances.

Another object of this invention is to provide said PPI type display of protuberances beneath a moving craft by employing the Doppler shift of a reflected continuous wave radar signal.

When a craft is moving on a level course, its rate of approach to protuberances below, which reflect radar signals emanating from the craft back to the craft, may be determined by measuring the Doppler shift of the returned signal. The instantaneous rates of approach of the craft with respect to protuberances directly below the line of its instantaneous true path bear the same relation to each other as the instantaneous distances from craft to the protuberances bear to each other. This relation between rates of approach to protuberances and distances to the same protuberances is apparent considering the relationship between rate of approach and the true speed of the craft. For example, the rate of approach to a given protuberance divided by true speed of the craft is the cosine of the deflection angle formed by the instantaneous true path line and a straight line from the craft to the protuberance, and the height of the craft (which is known) divided by distance to the given protuberance is also equal to the cosine of that angle. Thus, rate of approach to a protuberance can be related to the distance to the protuberance, and it is this relationship that is employed in this invention to translate Doppler shift of reflected radar signal, which is equivalent to rate of approach, to distance to the reflecting protuberance or object.

It is a feature of this invention to employ a continuous wave radar system to scan a given sector beneath and in advance of a moving craft, detecting reflections from objects in that sector and separating a plurality of different Doppler shifted signals from the reflected radar signal by employing a plurality of different frequency filters.

It is another feature of this invention to time sample the output of said plurality of different frequency filters so as to control the intensity of the beam of said PPI type display.

It is another feature of this invention to sequentially sample the output of said filters by coupling each output to an LC delay network which is fed timed pulses from a pulse generator and to employ the same pulses in conjunction with radar sweep to control the range and direction of sweep on said PPI type display.

Other and further features and objects of this invention will be apparent from the following specific description and drawings wherein:

FIG. 1 shows the geometry useful in explanation; and
FIG. 2 shows a block diagram and electrical schematic of a CW radar system and means for employing that system in conjunction with a PPI type display in accordance with the present invention.

In FIG. 1 there is shown an aircraft 1 at height H above the ground equipped with a CW radar system in its nose at point X, this system having an antenna pattern essentially as indicated by dotted line 2. Assume ground profile directly below the line of instantaneous craft velocity $V_x$ is as shown in the figure, having protuberances A, B, and C, each having a height which is small relative to H. The instantaneous rate of approach of craft 1 to protuberances A, B, and C is indicated by approach vectors $V_a$, $V_b$, and $V_c$, respectively, while lines $R_a'$, $R_b'$ and $R_c'$ represent instantaneous distances from point X to the reflecting surfaces of protuberances A, B, and C, respectively. The angles $\theta_a$, $\theta_b$, and $\theta_c$ represent deflection angles from the craft's instantaneous path line to direct line paths to the protuberances A, B, and C, respectively, while lines $R_a$, $R_b$, and $R_c$ represent direct line horizontal distances from the point O, directly below point X, to protuberances A, B, and C, respectively. Since the height of each protuberance is small with respect to H, the following relationship between approach velocity to a protuberance and ground distance to the same protuberance can be derived by geometry:

$$R_a \cong H/\sqrt{(V_x^2/V_a^2)-1}$$
$$R_b \cong H/\sqrt{(V_x^2/V_b^2)-1}$$
$$R_c \cong H/\sqrt{(V_x^2/V_c^2)-1}$$

Thus, it is seen that horizontal distance from the craft to a protuberance on the ground is a function of the height, true speed, and the reciprocal of the rate of closing or approach of the craft to the protuberance. Employing this relationship, the system shown in FIG. 2 is designed to indicate relative range to ground protuberances in the path of a craft moving at a known height and speed and to indicate relative range to protuberances on either side of said path to a lesser degree of accuracy.

In FIG. 2 there is shown a CW radar system 3 comprising a transmitting and receiving antenna 4 coupled to a hybrid coupler which may be a "magic T junction" 5 which is fed signals from CW transmitter 6 and in turn feeds received signals to mixer 7. Mixer 7 is also fed by local oscillator 8 so that the local oscillator frequency and received signal frequencies are beat to lower IF frequencies which are detected by IF amplifier 9. Antenna 4 is caused to sweep a given sector in advance of and below a moving aircraft by antenna drive motor 10 which also positions the rotor of a synchro transformer 11. The rotor of synchro transformer 11 is fed saw-tooth pulses from saw-tooth pulse generator 12, which is triggered by timed pulses from pulse generator 13. One stator of synchro transformer 11 is coupled to horizontal sweep transformer circuit 14, while the other stator is coupled to vertical sweep transformer circuit 15. The output of each of these sweep transformer circuits is fed to its associated horizontal or vertical deflecting coil 16 or 17 on cathode ray tube 18. The face of CRT 18 is represented by 19 showing the plan position indications.

In operation, antenna 4 is caused to sweep the given sector and saw-tooth pulses triggered from generator 13 and formed by generator 12 are fed to the rotor of synchro transformer 11 which is mechanically coupled to antenna drive motor 10 while the outputs from the stators in synchro transformer 11 are fed to their associated transformer circuits, which in turn energize the horizontal and vertical deflecting coils on CRT 18, causing a portion of the face of that tube, shown in 19, to be swept in range and azimuth by the beam of the tube. The sweep angle is indicated by the angle $\phi$, and range is indicated by the radial vector R. The system described above is a typical continuous wave radar system having its antenna drive coupled to the sweeping means of a PPI type CRT. There are many different existing systems, such as, for example, the one described in "Radar System Fundamentals," Navships 900,017, published by the Bureau of Ships, Navy Department, April 1944, which would readily serve to accomplish this.

The beam of CRT 18 is intensity controlled at resistor 20 by pulses via beam intensity voltage line 21 from delay and sampling network 22. Network 22 is in turn fed a plurality of signals from a plurality of different frequency filters in filter network 23. Filter network 23 is in turn coupled to the output of IF amplifier 9 of CW radar system 3. It is desirable for accuracy that a greater number of different frequency filters be employed than are shown in the figure. However, for the purpose of this description, filters A through E only are shown in FIG. 2. Each of filters A through E is tuned to pass a different Doppler shifted IF frequency in the output from IF amplifier 9, and the filters are arranged as shown so that filter A passes the lowest Doppler shifted frequency, filter B passes the next lowest Doppler shifted frequency, and so on to the last filter which in this case is filter E. Filter E passes the highest doppler shifted frequency. Thus, the output of each filter is indicative of the presence of a reflected signal from a reflecting type ground protuberance or other reflecting body toward which the aircraft is moving at a given velocity; the least velocity being indicated by the output of filter A, while the greatest velocity is indicated by the output of filter E. The output of a filter, say, for example, filter A, is coupled to an LC delay network 24 at a given point M via a pair of resistors in series, such as resistors 25 and 26. A diode 27 is coupled between resistors 25 and 26 to the beam intensity voltage line 21 in an electrical current direction towards the line. Pulses are fed from pulse generator 13 via blocking capacitance 28 to LC delay network 24.

In operation, these pulses cause a voltage rise at points along inductance 29 of LC network 24 as the pulses progress through the network. When a pulse passes the point coupled to a resistor which is in turn coupled via another resistor to one of the filters, the voltage level between those resistors increases to a value slightly less than that required to cause the diode coupled thereto to conduct. Therefore, if at the time from pulse sweep generator 13 has raised the voltage at a given diode, the particular Doppler shifted frequency is detected and passed by the filter associated with that diode, then the voltage at the given diode will be raised further and the diode will conduct. When a diode conducts, it passes a pulse to intensity control voltage line 21 and thence to resistor 20 of CRT 18 to control the intensity of the beam of CRT 18. A single pulse applied from pulse generator 13 to LC delay circuit 24 consecutively raises the voltage at each diode associated with each filter in filter network 23 in a given time interval. That time interval must be less than the time interval between pulses from pulse generator 13 because those same pulses also serve to initiate the sweep of the beam of CRT 18. Thus, the intensity control pulses applied sequentially to line 21 by the diodes control the intensity of the beam of CRT 18 indicating on the face 19 of the CRT the relative distance from the aircraft to reflecting objects or protuberances below. Rheostat 29 is provided to adjust the threshold intensity of the beam of CRT 18.

While I have described above the principles of my invention in connection with specific apparatus, it is to be clearly understood that this description is made only by way of example and not as a limitation to the scope of my invention as set forth in the objects thereof and in the accompanying claims.

I claim:

1. A plan position indicating system to indicate the relative positions of objects below a moving craft comprising azimuth sweeping radar means transmitting a continuous wave signal and receiving its reflection from said objects, sweep position detection means coupled to the antenna sweep drive of said radar means, plan position indicating means coupled to the output of said sweep position detection means, a plurality of filter means to separate each of a plurality of Doppler shifted frequency signals in the received signal from said radar means, pulse generating means, means coupling the output of said pulse generating means with said sweep position detection means to trigger the sweep of a given sector in advance of and below said moving craft, a plurality of delay means coupling the output of said pulse generating means to said filter means to separate Doppler shifted frequency signals each of said delay means representing a given radial distance on said plan position indicating means, so that a coincidence of signals passed by said filter means and pulses from said pulse generating means causes pulses to be fed to said plan position indicating means to indicate the relative positions of said objects.

2. A plan position indicating system to indicate the relative positions of objects in a given sector below and in advance of a moving craft comprising sector sweeping radar means transmitting a continuous wave signal and receiving reflections from objects in said sector below said craft, a plan position indicating cathode ray tube, a range pulse generator, a saw-tooth pulse generator coupled to said range pulse generator, resolving means coupled to the output of said saw-tooth pulse generator and to the output of the antenna drive motor of said radar means providing signals to control energization of the horizontal and vertical deflecting coils of said cathode ray tube, a plurality of different frequency tuned filters each responsive to a different Doppler shifted frequency, means coupling the output of said receiver to said filters, and a delay network coupled to the output of said filters which is fed pulses from said range pulse generator so that a coincidence of signals passed by said filter means and said pulses causes pulses to be sequentially fed to means which control the intensity of the beam of said cathode ray tube thereby indicating the relative positions of said objects on the face of said tube.

3. A plan position indicating system to indicate the relative positions of objects in a given sector below and in advance of a moving craft comprising sector sweeping radar means transmitting a continuous wave signal and receiving reflections from objects in said sector below said craft, a plan position indicating cathode ray tube, a range pulse generator, a saw-tooth pulse generator coupled to said range pulse generator and responsive to the output thereof, resolving means coupled to the output of said saw-tooth pulse generator and to the output of the antenna drive motor of said radar means providing signals to control energization of the horizontal and vertical deflecting means of said cathode ray tube, a plurality of different frequency tuned filters each responsive to a different Doppler shifted frequency coupled to the receiver of said radar means, a plurality of delay lines, means coupling the output of each of said filters to a corresponding one of said delay lines, means coupling the output of each delay line in series to the input of the following delay line, means coupling the output of said pulse generator to the input of the first delay line so that a coincidence of signals from each of said filters indicative of detection of different Doppler shifted frequencies and the pulse output of said pulse generator causes pulses to be sequentially fed to means which control the intensity of the beam of said cathode ray tube thereby indicating the relative positions of said objects on the face of said tube.

References Cited in the file of this patent

UNITED STATES PATENTS

| | | |
|---|---|---|
| 2,535,274 | Dicke | Dec. 26, 1950 |
| 2,637,024 | Lyman | Apr. 28, 1953 |
| 2,896,203 | Wright | July 21, 1959 |
| 2,913,717 | Brandon | Nov. 17, 1959 |